United States Patent [19]

Uehara

[11] Patent Number: 5,063,554
[45] Date of Patent: Nov. 5, 1991

[54] MAGNETO-OPTIC DISK UNIT HAVING MEANS FOR PREVENTING ERRONEOUS INSERTION OF DISK CARTRIDGE

[75] Inventor: Keiji Uehara, Iruma, Japan
[73] Assignee: TEAC Corporation, Japan
[21] Appl. No.: 467,927
[22] Filed: Jan. 22, 1990

[30] Foreign Application Priority Data

Jan. 24, 1989 [JP] Japan ................................. 1-6568

[51] Int. Cl.⁵ .................... G11B 33/00; G11B 33/06
[52] U.S. Cl. .............................. 369/77.2; 369/77.1; 369/79; 360/99.06
[58] Field of Search ............. 369/291, 77.1, 77.2, 369/79, 13, 53, 127, 291, 292; 360/99.02, 99.06

[56] References Cited

U.S. PATENT DOCUMENTS

| | | | |
|---|---|---|---|
| 2,777,699 | 1/1957 | Woodruff | 369/79 |
| 4,205,853 | 6/1980 | Torrington | 369/77.2 |
| 4,443,872 | 4/1984 | Kirschner | 369/79 |
| 4,731,776 | 3/1988 | Ishii | 369/77.2 |
| 4,736,356 | 4/1988 | Konshak | 369/79 |
| 4,800,554 | 1/1989 | Yamasaki | 369/39 |
| 4,878,139 | 10/1989 | Hasegawa | 369/99.02 |
| 4,901,174 | 2/1990 | Saito | 360/99.06 |

FOREIGN PATENT DOCUMENTS 0204921 12/1986 European Pat. Off. ............ 369/77.1
0220458 9/1988 Japan ................................... 369/77.1

Primary Examiner—Stuart S. Levy
Assistant Examiner—John C. Pokotylo
Attorney, Agent, or Firm—Andrus, Sceales, Starke & Sawall

[57] ABSTRACT

A magneto-optic disk unit comprises a casing having an opening through which a disk cartridge is inserted into and extracted from the casing, a cartridge holder having an inserting opening for receiving the disk cartridge which is inserted through the opening of the casing, and an erroneous insertion preventing mechanism which is provided on the cartridge holder. The erroneous insertion preventing mechanism comprises an erroneous insertion preventing part which is provided in an inserting path of the disk cartridge and confronts a sloping surface of a magneto-optic disk cartridge which is inserted through the opening of the casing in a correct position for permitting the insertion of only the magneto-optic disk cartridge to a predetermined position within the cartridge holder when the magneto-optic disk cartridge is inserted in the correct position.

10 Claims, 7 Drawing Sheets

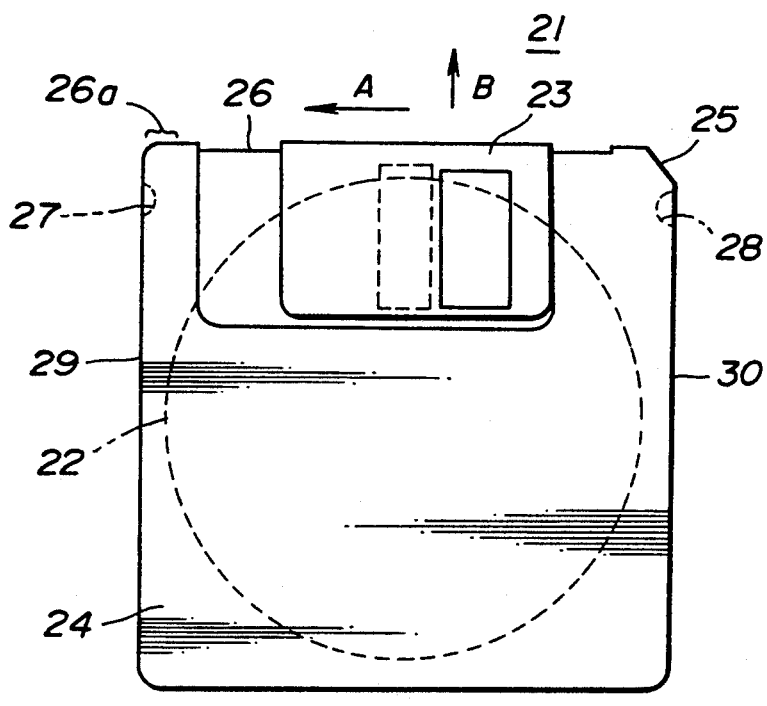
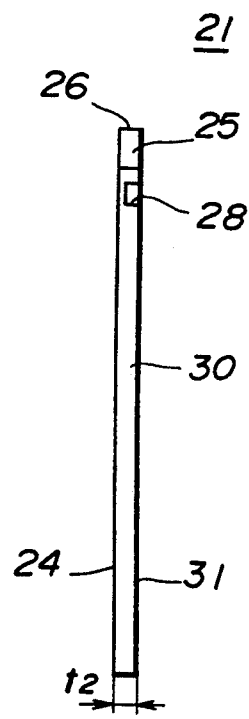
FIG.3A  FIG.3B
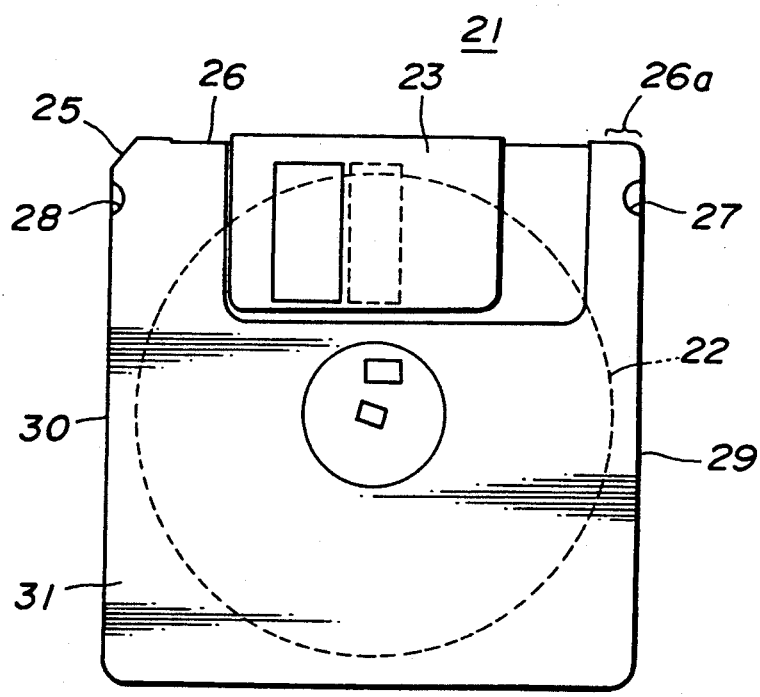
FIG.3C

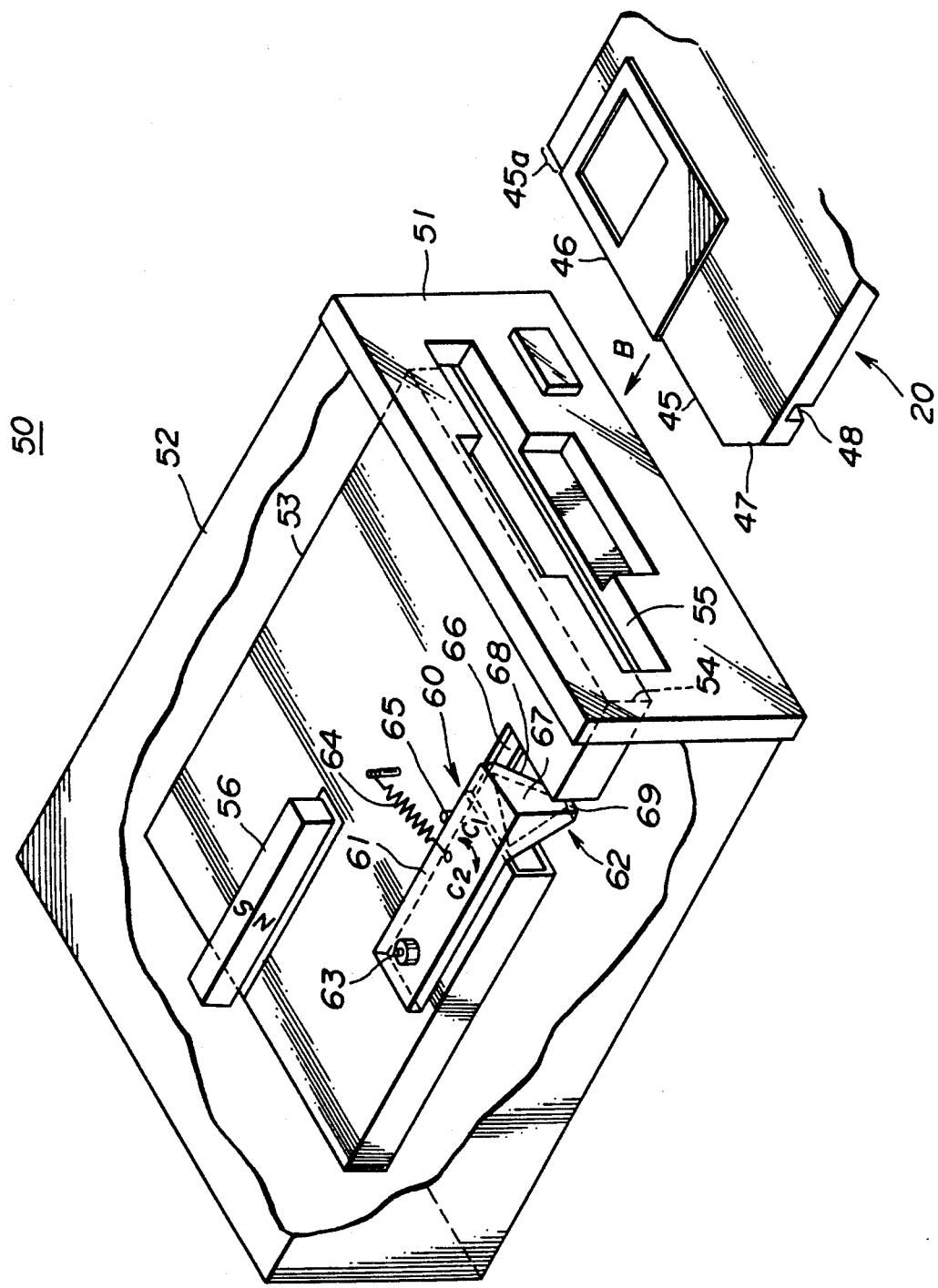

MAGNETO-OPTIC DISK UNIT HAVING MEANS FOR PREVENTING ERRONEOUS INSERTION OF DISK CARTRIDGE

BACKGROUND OF THE INVENTION

The present invention generally relates to magneto-optic disk units, and more particularly to a magneto-optic disk unit which plays a cartridge type magneto-optic disk.

Presently, a magneto-optic disk unit which is designed to play a cartridge type magneto-optic disk is being developed. Such a cartridge type magneto-optic disk is made up of a cartridge which accommodates a magneto-optic disk, similarly to a cartridge type magnetic disk which is played on a magnetic disk unit. For example, when a magneto-optic disk with a 3.5 inch diameter is accommodated within a cartridge with a shutter, the external appearance of the cartridge becomes similar to the existing 3.5-inch magnetic disk cartridge.

Because the magneto-optic disk has a thickness greater than that of the magnetic disk, the magneto-optic disk cartridge becomes thicker than the magnetic disk cartridge. For this reason, a cartridge holder of the magneto-optic disk unit becomes bulky compared to a cartridge holder of the magnetic disk unit. Therefore, the magnetic disk cartridge may be erroneously inserted into the magneto-optic disk unit.

FIGS. 1A and 1B are diagrams for explaining the problems of the prior art. In FIGS. 1A and 1B, a magnetic disk 1 is accommodated within a magnetic disk cartridge 2. A magneto-optic disk 3 is accommodated within a magneto-optic disk cartridge 4. A magneto-optic disk unit 5 has a cartridge holder 6, and a magnetic disk unit 7 has a cartridge holder 8.

As shown in FIG. 1B, it is possible to insert the magnetic disk cartridge 2 into the cartridge holder 8 of the magnetic disk unit 7 as indicated by an arrow 9. However, because the thickness of the magneto-optic disk cartridge 4 is greater than that of the magnetic disk cartridge 2, the magneto-optic disk cartridge 4 cannot be inserted into the cartridge holder 8 of the magnetic disk unit 7 as indicated by a crossed out arrow 10.

However, as shown in FIG. 1A, both the magneto-optic disk cartridge 4 and the magnetic disk cartridge 2 can be inserted into the cartridge holder 6 of the magneto-optic disk unit 5 as indicated by arrows 11 and 12, because the thickness of the magnetic disk cartridge 2 is smaller than that of the magneto-optic disk cartridge 4.

A permanent magnet (not shown) for applying an external magnetic field is provided within the magneto-optic disk unit 5. For this reason, when the magnetic disk cartridge 2 is erroneously inserted into the cartridge holder 6 of the magneto-optic disk unit 5, the data prerecorded on the magnetic disk 1 may be damaged or erased by the permanent magnet.

Therefore, it is not only necessary for the magneto-optic disk unit 5 to prevent an erroneous insertion of the magneto-optic disk cartridge 4 in a wrong position (for example, upside down) but also necessary to prevent an erroneous insertion of the magnetic disk cartridge 2. However, there is a problem in that the conventional magneto-optic disk unit 5 has no means for preventing both these types of erroneous insertions.

SUMMARY OF THE INVENTION

Accordingly, it is a general object of the present invention to provide a novel and useful magneto-optic disk unit in which the problems described above are eliminated.

Another and more specific object of the present invention is to provide a magneto-optic disk unit for playing a magneto-optic disk which is accommodated within a magneto-optic disk cartridge, where the magneto-optic disk cartridge has a generally rectangular shape with a front edge, first and second surfaces confronting respective sides of the magneto-optic disk, a sloping portion formed in the front edge on a first side of the magneto-optic disk cartridge and a first depression formed in the second surface on a second side of the magneto-optic disk cartridge, the magneto-optic disk cartridge has size and structure similar to those of a magnetic disk cartridge which accommodates a magnetic disk and has a thickness t2 which is smaller than a thickness t1 of the magneto-optic disk cartridge, and the magnetic disk cartridge has a generally rectangular shape with a front edge, first and second surfaces confronting respective sides of the magnetic disk and a second depression formed in the second surface on a second side of the magnetic disk cartridge. The magneto-optic disk unit comprises a casing having an opening through which a disk cartridge is inserted into and extracted from the casing, a cartridge holder having an inserting opening for receiving the disk cartridge which is inserted through the opening of the casing, and an erroneous insertion preventing mechanism which is provided on the cartridge holder. The erroneous insertion preventing mechanism comprises an erroneous insertion preventing part which is provided in an inserting path of the magneto-optic disk cartridge and confronts the sloping surface of the magneto-optic disk cartridge which is inserted through the opening of the casing in a correct position for permitting the insertion of only the magneto-optic disk cartridge to a predetermined position within the cartridge holder when the magneto-optic disk cartridge is inserted in the correct position. According to the magneto-optic disk unit of the present invention, it is possible to positively prevent the erroneous insertion of the magneto-optic disk cartridge in a wrong position and also prevent the erroneous insertion of the magnetic disk cartridge regardless of whether the magnetic disk cartridge is inserted in the correct position or the wrong position. Hence, it is possible to positively prevent an accident in which the prerecorded data on the magnetic disk is damaged or erased by the magnetic field generated by a permanent magnet which is provided within the casing. In addition, it is possible to prevent a shutter opening mechanism of the magneto-optic disk unit from being damaged by the erroneous insertion of the magnetic disk cartridge.

Other objects and further features of the present invention will be apparent from the following detailed description when read in conjunction with the accompanying drawings.

BRIEF DESCRIPTION OF THE DRAWINGS

FIGS. 3A, 3B and 3C respectively are a plan view, a side view and a bottom view of a magnetic disk cartridge;

FIG. 4 is a perspective view showing an embodiment of a magneto-optic disk unit according to the present invention with a portion of a casing omitted;

DESCRIPTION OF THE PREFERRED EMBODIMENTS

First, a description will be given of a 3.5-inch magneto-optic disk cartridge which is played in a magneto-optic disk unit according to the present invention, in comparison with a 3.5-inch magnetic disk cartridge.

Figure 1A:
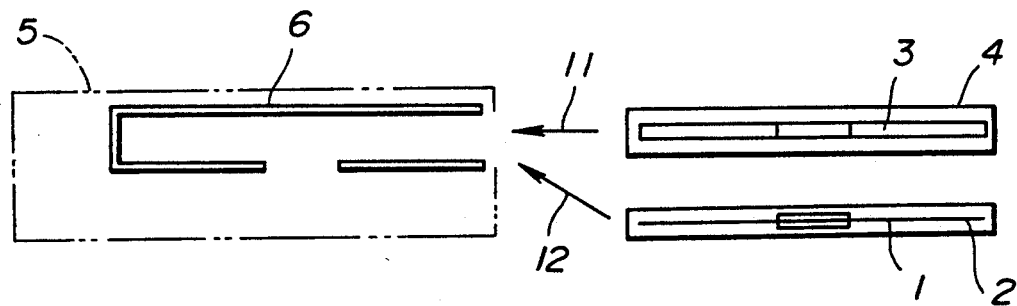
FIG. 1A is a diagram for explaining insertion of disk cartridges into a magneto-optic disk unit.
Figure 1B:
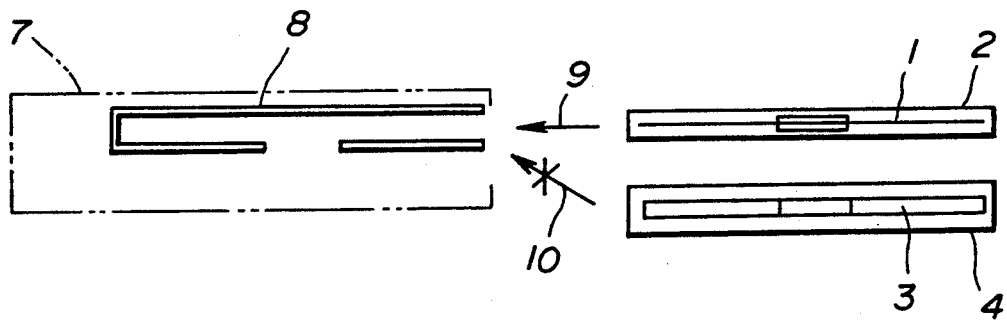
FIG. 1B is a diagram for explaining insertion of a magnetic disk cartridge into a magnetic disk unit.
Figure 2A:
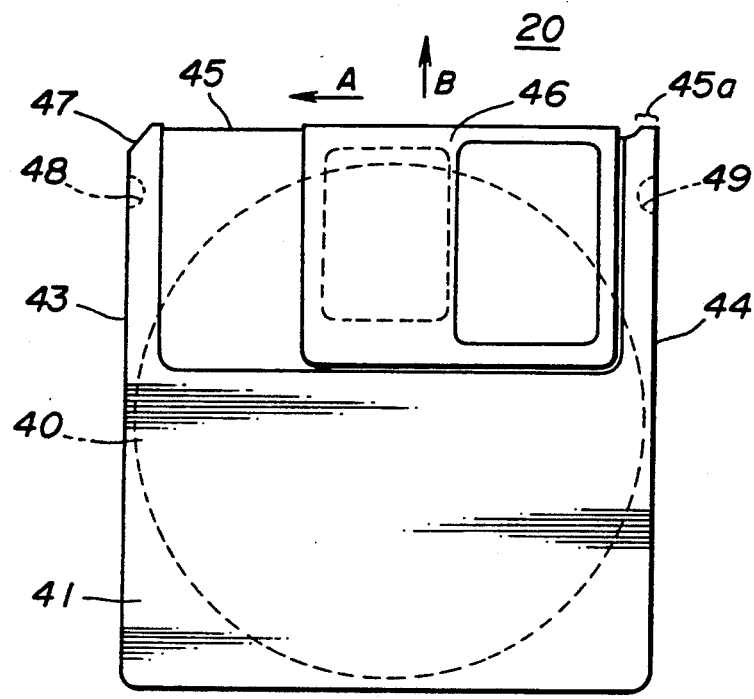
FIGS. 2A, 2B and 2C respectively are a plan view, a side view and a bottom view of a magneto-optic disk cartridge.
Figure 2B:
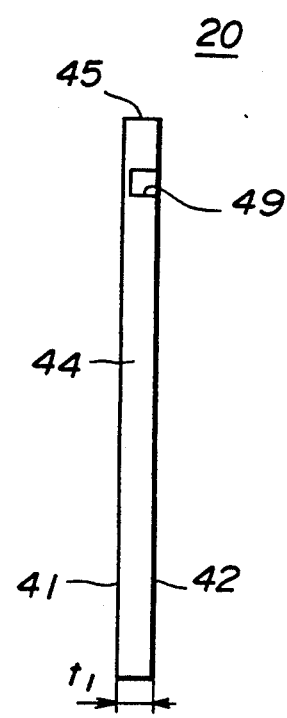
Figure 2C:
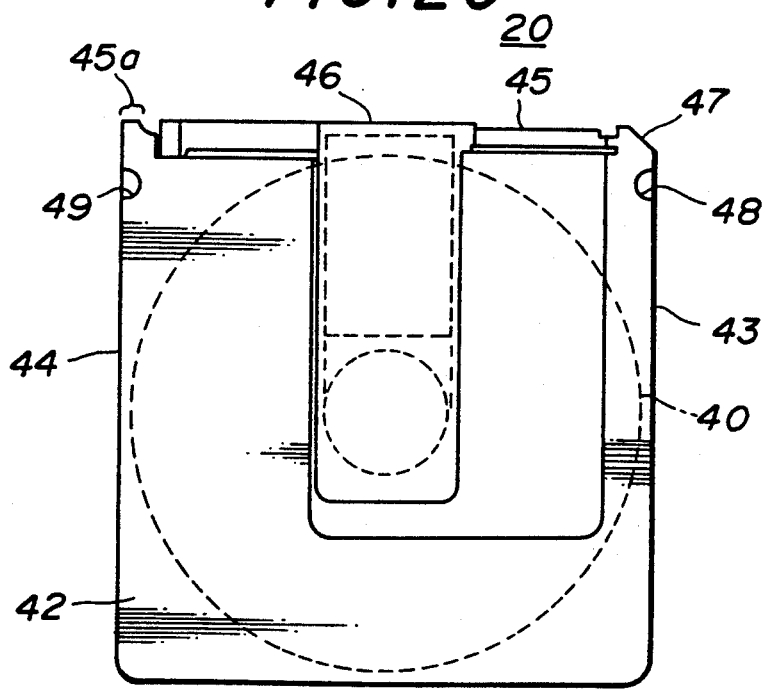

FIGS. 2A, 2B and 2C respectively are a plan view, a side view and a bottom view of a magneto-optic disk cartridge 20 which accommodates a magneto-optic disk 40. FIGS. 3A, 3B and 3C respectively are a plan view, a side view and a bottom view of a magnetic disk cartridge 21 which accommodates a magnetic disk 22.

In FIGS. 3A through 3C, the magnetic disk cartridge 21 has a shutter 23 which is slidable on a top surface 24. The shutter 23 opens when it slides in a direction A. A sloping portion 25 is formed on a right end of a front edge 26 of the magnetic disk cartridge 21 in FIG. 3A. An erroneous insertion detecting portion 26a is formed on a left end of the front edge 26. Depressions 27 and 28 are respectively formed in side surfaces 29 and 30 of the magnetic disk cartridge 21 at positions closer to the front edge 26. The depressions 27 and 28 respectively open to the side surfaces 29 and 30 and to a bottom surface 31 of the magnetic disk cartridge 21.

As shown in FIGS. 2A through 2C, the magneto-optic disk cartridge 20 has a thickness t1 which is approximately two times a thickness t2 of the magnetic disk cartridge 21. But the other dimensions of the magneto-optic disk cartridge 20 are approximately the same as those of the magnetic disk cartridge 21. The magneto-optic disk cartridge 20 has a top surface 41, a bottom surface 42, side surfaces 43 and 44, and a front edge 45.

The magneto-optic disk cartridge 20 has a shutter 46 which is slidable on the top surface 41. The shutter 46 opens when it slides in the direction A. A sloping portion 47 is formed on a left end of the front edge 45 of the magneto-optic disk cartridge 20 in FIG. 2A. An erroneous insertion detecting portion 45a is formed on a right end of the front edge 45. Depressions 48 and 49 are respectively formed the side surfaces 43 and 44 of the magneto-optic disk cartridge 20 at positions closer to the front edge 45. The depressions 48 and 49 respectively open to the side surfaces 43 and 44 and to the bottom surface 42 of the magneto-optic disk cartridge 20.

In FIGS. 2A through 2C and FIGS. 3A through 3C, an arrow B indicates a cartridge inserting direction in which the disk cartridges 20 and 21 are inserted into the magneto-optic disk unit.

Figure 5:
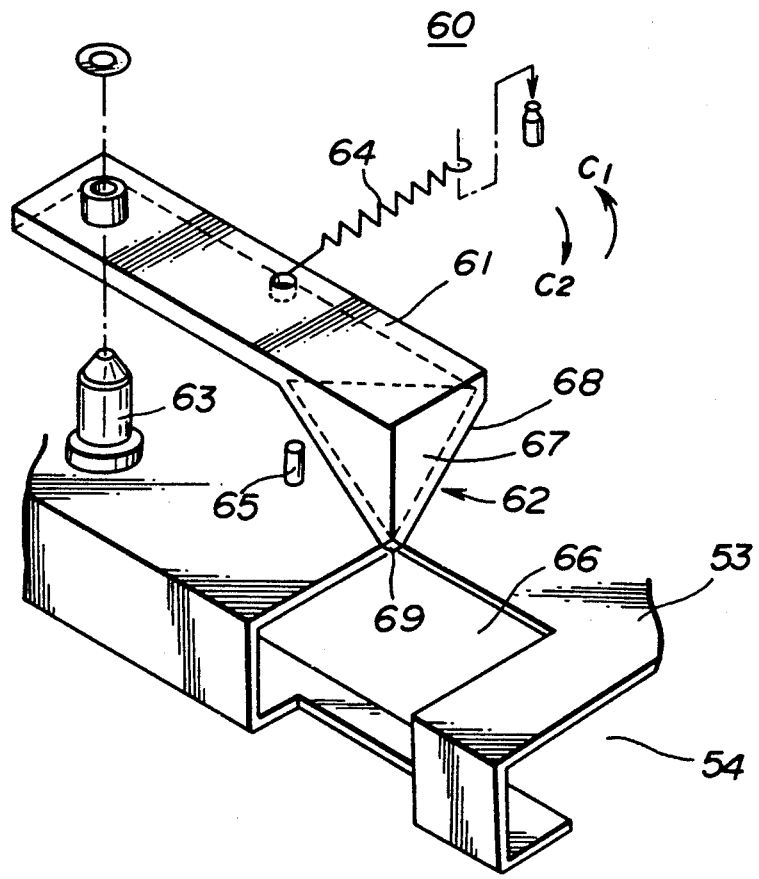
FIG. 5 is a disassembled perspective view showing an erroneous insertion preventing mechanism shown in FIG. 4.

Next, a description will be given of an embodiment of the magneto-optic disk unit according to the present invention, by referring to FIGS. 4 through 6.

In FIG. 4, a magneto-optic disk unit 50 generally comprises a front bezel 51 and a casing 52. A cartridge holder 53 is provided within the casing 52. The cartridge holder 53 is formed from a metal plate which is bent to the shape of the magneto-optic disk cartridge 20. When inserting the magneto-optic disk cartridge 20 into the magneto-optic disk unit 50, the cartridge holder 53 is located at a height position H1 where an inserting opening 54 of the cartridge holder 53 coincides with an opening 55 of the front bezel 51 as shown in FIG. 4 and indicated by a phantom line in FIG. 6. When the magneto-optic disk cartridge 20 is inserted into the cartridge holder 53, the cartridge holder 53 moves down to a position H2.

A permanent magnet 56 is provided within the casing 52 to apply an external magnetic field on the magneto-optic disk 40 during a recording/reproducing mode. An erroneous insertion preventing mechanism 60 is provided in the cartridge holder 53 on the left side when viewed from the inserting opening 54. The erroneous insertion preventing mechanism 60 is shown in FIG. 5. The erroneous insertion preventing mechanism 60 includes an arm-shaped erroneous insertion preventing member 61 which has an erroneous insertion preventing part 62 on a tip end thereof.

The erroneous insertion preventing member 61 is provided on a top surface of the cartridge holder 53 in a state where a base portion of the erroneous insertion preventing member 61 is pivotally supported on a shaft 63 which is provided on the top surface of the cartridge holder 53. The erroneous insertion preventing member 61 is also urged to rotate in a direction C1 by the action of a spring 64 and the position of the erroneous insertion preventing member 61 is restricted by a stopper pin 65. In other words, the erroneous insertion preventing member 61 extends in a direction such that the erroneous insertion preventing part 62 faces the inserting opening 54.

A cutout 66 is formed in the cartridge holder 53. This cutout 66 is located at a left portion of the cartridge holder 53 when viewed from the inserting opening 54 and is relatively close to the inserting opening 54. The erroneous insertion preventing part 62 fits into the cutout 66. The erroneous insertion preventing part 62 has a generally pyramid shape and comprises a triangular receiving surface 67, a sloping portion 68 and a vertex portion 69. The triangular receiving surface 67 is perpendicular to the cartridge inserting direction B. The sloping portion 68 extends obliquely from the top surface of the cartridge holder 53 towards the side surface of the cartridge holder 53. The vertex portion 69 is located on the lower end of the sloping portion 68.

Next, a description will be given of the operation of the erroneous insertion preventing mechanism 60, by referring to FIGS. 7 through 10.

Figure 7:
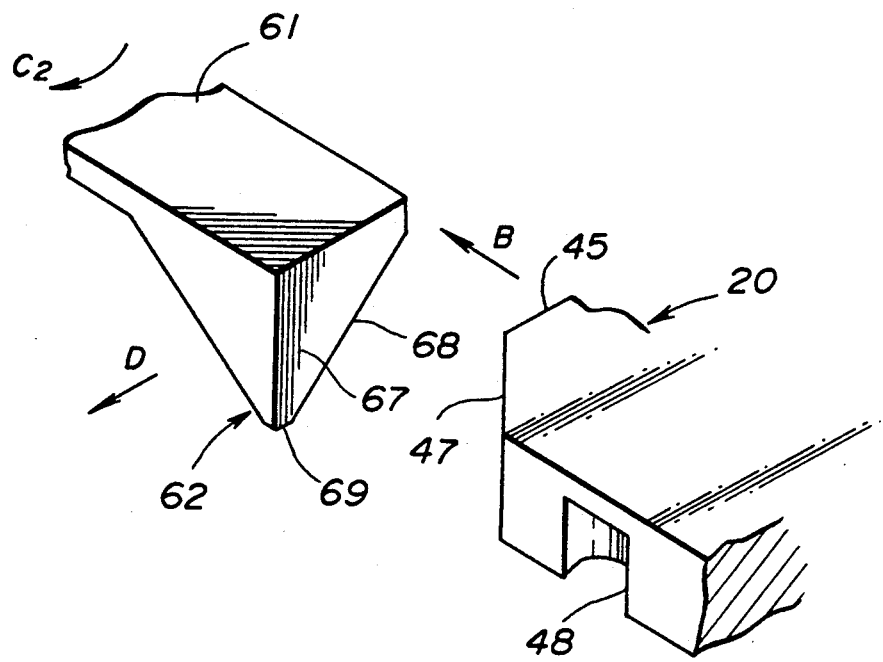
FIG. 7 is a perspective view for explaining a relationship between an erroneous insertion preventing part and a magneto-optic disk cartridge when the magneto-optic disk cartridge is inserted in a correct position.

The magneto-optic disk cartridge 20 is inserted into the cartridge holder 53 shown in FIG. 4 in the cartridge inserting direction B through the opening 55 and the inserting opening 54. When the magneto-optic disk cartridge 20 is inserted in the correct position with the top surface 41 facing up, the sloping portion 47 of the magneto-optic disk cartridge 20 confronts the erroneous insertion preventing part 62 as shown in FIG. 7.

In this case, the sloping portion 47 makes contact with the sloping portion of the erroneous insertion preventing part 62, and the erroneous insertion preventing part 62 is pushed in a direction D as the magneto-optic disk cartridge 20 is inserted. Hence, the erroneous insertion preventing member 61 rotates in a direction C2 against the force exerted by the spring 64 and the magneto-optic disk cartridge 20 can be inserted further into the cartridge holder 53. Because the depression 48 does not open to the top surface 41, the erroneous insertion preventing part 62 will not engage the depression 48, and the magneto-optic disk cartridge 20 is inserted into a predetermined position within the cartridge holder 53. The shutter 46 of the magneto-optic disk cartridge 20 is opened by a shutter opening mechanism (not shown) as the magneto-optic disk cartridge 20 is inserted into the predetermined position.

Figure 6:
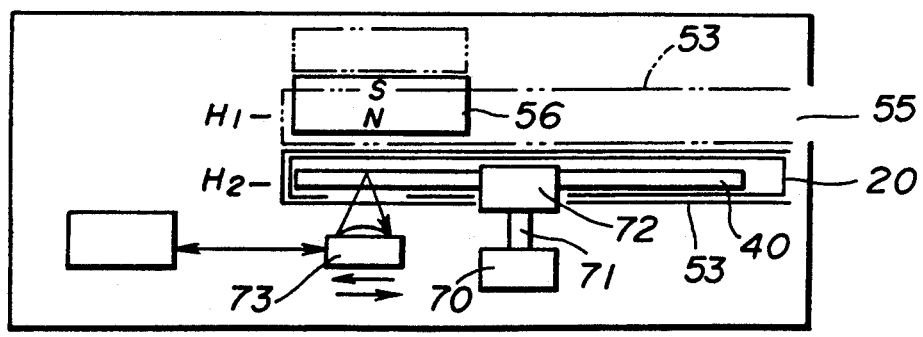
FIG. 6 is a side view generally showing the magneto-optic disk unit shown in FIG. 4.

When the magneto-optic disk cartridge 20 is inserted into the predetermined position within the cartridge holder 53, the cartridge holder 53 is lowered to the position H2 as shown in FIG. 6 by a holder driving mechanism (not shown). Hence, the magneto-optic disk 40 is placed on a disk table 72 which is provided on a spindle 71, and a motor 70 rotates the disk table 72 to rotate the magneto-optic disk 40. An optical pickup device 73 carries out a signal recording and/or reproduction with respect to the rotating magneto-optic disk 40.

Figure 8:
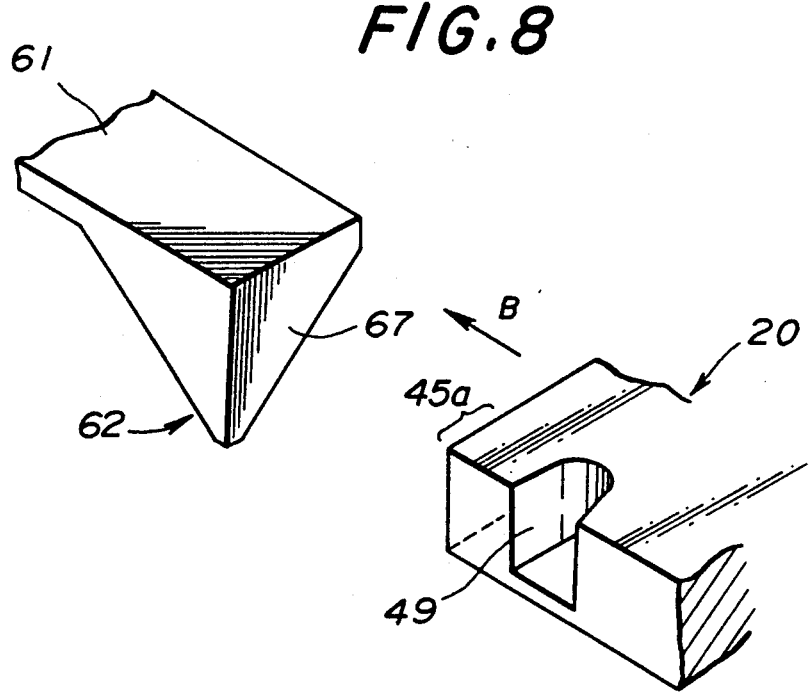
FIG. 8 is a perspective view for explaining a relationship between the erroneous insertion preventing part and the magneto-optic disk cartridge when the magneto-optic disk cartridge is inserted in a wrong position.

On the other hand, when the magneto-optic disk 20 is erroneously inserted into the cartridge holder 53 in a wrong position, that is, with the top surface 41 facing down, the erroneous insertion detecting portion 45a of the magneto-optic disk cartridge 20 hits the receiving surface 67 of the erroneous insertion preventing part 62 as shown in FIG. 8. Hence, the magneto-optic disk cartridge 20 is prevented from being inserted further into the cartridge holder 53 and the erroneous insertion of the magneto-optic disk cartridge 20 is positively prevented.

Next, a description will be given of a case where the magnetic disk cartridge 21 is erroneously inserted into the cartridge holder 53 of the magneto-optic disk unit 50.

As described above, the magnetic disk cartridge 21 has the thickness t2 which is smaller than the thickness t1 of the magneto-optic disk cartridge 20, but the other dimensions of the magnetic disk cartridge 21 are approximately the same as those of the magneto-optic disk cartridge 20. For this reason, the magnetic disk cartridge 21 can also be inserted into the cartridge holder 53 through the opening 55 and the inserting opening 54.

Figure 9:
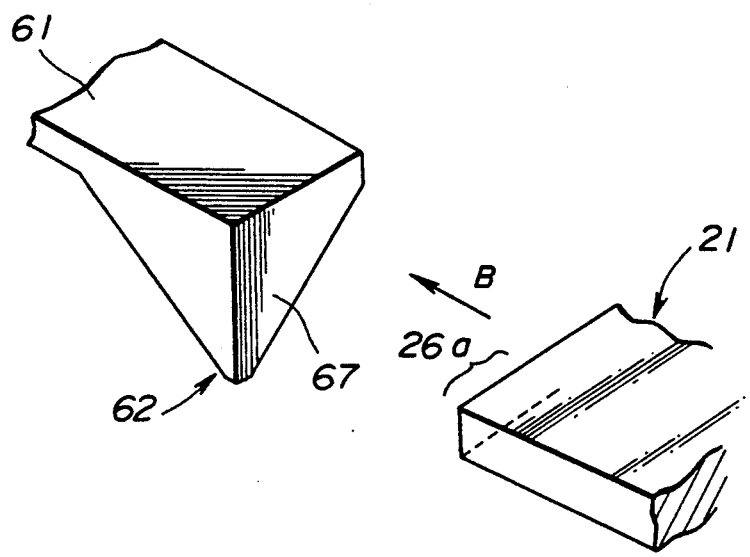
FIG. 9 is a perspective view for explaining a relationship between the erroneous insertion preventing part and a magnetic disk cartridge when the magnetic disk cartridge is inserted in a correct position.
Figure 10:
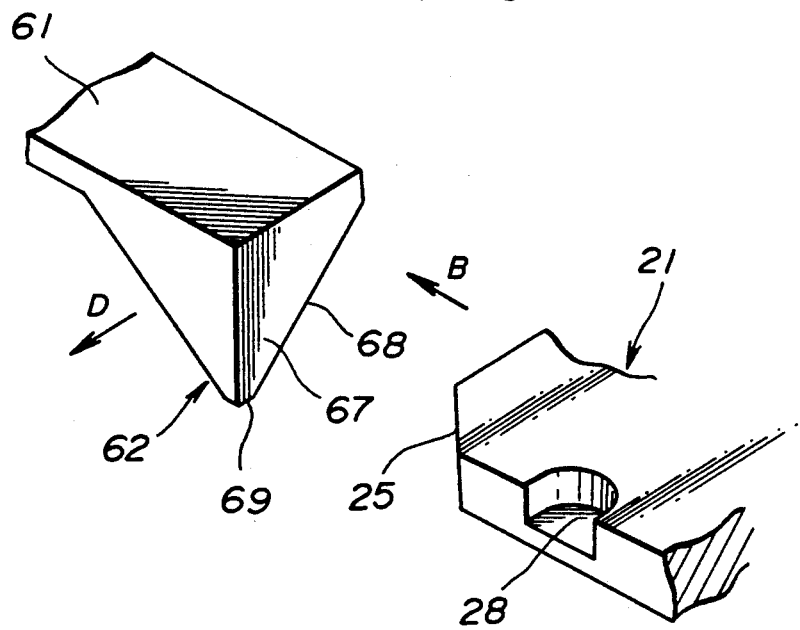
FIG. 10 is a perspective view for explaining a relationship between the erroneous insertion preventing part and the magnetic disk cartridge when the magnetic disk cartridge is inserted in a wrong position.

When the magnetic disk cartridge 21 is erroneously inserted into the cartridge holder 53 in a correct position with the top surface 24 facing up, the erroneous insertion detecting portion 26a of the magnetic disk cartridge 21 hits the receiving surface 67 of the erroneous insertion preventing part 62 as shown in FIG. 9.

Hence, the magnetic disk cartridge 21 is prevented from being inserted further into the cartridge holder 53 and the erroneous insertion of the magnetic disk cartridge 21 is positively prevented.

On the other hand, when the magnetic disk cartridge 21 is erroneously inserted into the cartridge holder 53 in a wrong position, that is, with the top surface 24 facing down, the sloping portion 25 of the magnetic disk cartridge 21 makes contact with the sloping portion 68 of the erroneous insertion preventing part 62. The erroneous insertion preventing part 62 is pushed in the direction D as the magnetic disk cartridge 21 is inserted. Hence, the magnetic disk cartridge 21 is inserted past the erroneous insertion preventing part 62. When the magnetic disk cartridge 21 is inserted further into the cartridge holder 53, the depression 28 confronts the erroneous insertion preventing part 62. Because the depression 28 opens to the top surface 24, the vertex portion 69 of the erroneous insertion preventing part 62 engages into the depression 28, and the magnetic disk cartridge 21 is positively prevented from being inserted into the predetermined position within the cartridge holder 53.

Therefore, regardless of whether the magnetic disk cartridge 21 is inserted into the cartridge holder 53 of the magneto-optic disk unit 50 in the correct position or the wrong position, the magnetic disk cartridge 21 is positively prevented from being inserted into the predetermined position within the cartridge holder 53. As a result, it is possible to positively, prevent an accident in which the prerecorded data on the magnetic disk 22 is damaged or erased by the magnetic field generated by the permanent magnet 56. In addition, it is possible to prevent the shutter opening mechanism of the magneto-optic disk unit 50 from being damaged by the erroneous insertion of the magnetic disk cartridge 21.

Further, the present invention is not limited to these embodiments, but various variations and modifications may be made without departing from the scope of the present invention.

What is claimed is:

1. A magneto-optic disk unit for playing a magneto-optic disk which is accommodated within a magneto-optic disk cartridge, said magneto-optic disk cartridge having a generally rectangular shape with a front edge, first and second surfaces confronting respective data recording surfaces of the magneto-optic disk, first and second sides, a sloping portion formed in the front edge adjacent said first side of the magneto-optic disk cartridge and a depression formed in the second surface along said second side of the magneto-optic disk cartridge, said magneto-optic disk cartridge having a size and structure similar to those of a magnetic disk cartridge which accommodates a magnetic disk and has a thickness t2 which is smaller than a thickness t1 of said magneto-optic disk cartridge, said magnetic disk cartridge having a generally rectangular shape with a front edge, first and second surfaces confronting respective data recording surfaces of the magnetic disk, first and second sides, and a depression formed in the second surface along said second side of the magnetic disk cartridge, said magneto-optic disk unit comprising:

a casing (52) having an opening through which a disk cartridge is inserted into and extracted from said casing;

a cartridge holder (53) having an inserting opening for receiving the disk cartridge which is inserted through the opening of said casing; and an erroneous insertion preventing mechanism (60) which is provided on said cartridge holder, said erroneous insertion preventing mechanism comprising a single erroneous insertion preventing element (62) which is provided in an inserting path of the disk cartridge and confronts the sloping surface of a magneto-optic disk cartridge inserted through the opening of said casing in a first orientation for permitting the insertion of a magneto-optic disk cartridge to a predetermined position within said cartridge holder when the magneto-optic disk cartridge is inserted in said first orientation, said erroneous insertion preventing element (62) being pivotally provided on said cartridge holder and having a sloping portion (68) which cooperates with the sloping portion of a magneto-optic disk cartridge and urging means (64) for urging said erroneous insertion preventing element in a predetermined direction (C1) with an urging force, said sloping portion of said erroneous insertion preventing element being pushed by the sloping portion of a magneto-optic disk cartridge inserted in said first orientation so that said erroneous insertion preventing part is removed from the inserting path of the magneto-optic disk cartridge against the urging force of said urging means in a direction (C2) opposite to said predetermined direction, said erroneous insertion preventing element (62) engaging one of the front edge adjacent the second side and the first depression of a magneto-optic disk cartridge inserted through the opening of said casing in a second orientation and prohibiting the insertion of the magneto-optic disk cartridge to said predetermined position within said cartridge holder when the magneto-optic disk cartridge is inserted in said second orientation.

2. The magneto-optic disk unit as claimed in claim 1 wherein said erroneous insertion preventing part is made up of a generally arm-shaped member which is provided on said cartridge holder and pivotable about a first end of the arm-shaped member, and a receiving portion which is formed on a second end of the arm-shaped member opposite to the first end and extending towards the inserting path, said receiving portion including said sloping portion.

3. The magneto-optic disk unit as claimed in claim 2 wherein said receiving portion is integrally formed on said arm-shaped member.

4. The magneto-optic disk unit as claimed in claim 1 wherein the first surface of the magneto-optic disk cartridge faces up in said first orientation and the second surface of the magneto-optic disk cartridge faces up in said second orientation.

5. The magneto-optic disk unit as claimed in claim 1 wherein said erroneous insertion preventing element has a generally pyramidal shape, said sloping portion forming one surface of the pyramidal shape.

6. The magneto-optic disk unit as claimed in claim 1 wherein said erroneous insertion preventing element engages the front edge of a magnetic disk cartridge inserted through the opening of said casing in a first orientation and prohibits the insertion of the magnetic disk cartridge to said predetermined position within said cartridge holder when the magnetic disk cartridge is inserted in said first orientation.

7. The magneto-optic disk unit as claimed in claim 1 wherein said sloping portion of said erroneous insertion preventing element engages the depression of a magnetic disk cartridge inserted through the opening of said casing in a second orientation and prohibits the insertion of the magnetic disk cartridge to said predetermined position within said cartridge holder when the magnetic disk cartridge is inserted in said second orientation.

8. A magneto-optic disk unit for playing a magneto-optic disk which is accommodated within a magneto-optic disk cartridge, said magneto-optic disk cartridge having a generally rectangular shape with a front edge, first and second surfaces confronting respective data recording surfaces of the magneto-optic disk, first and second sides, a sloping portion formed in the front edge adjacent said first side of the magneto-optic disk cartridge and a depression formed in the second surface along said second side of the magneto-optic disk cartridge, said magneto-optic disk cartridge having a size and structure similar to those of a magnetic disk cartridge which accommodates a magnetic disk and has a thickness t2 which is smaller than a thickness t1 of said magneto-optic disk cartridge, said magnetic disk cartridge having a generally rectangular shape with a front edge, first and second surfaces confronting respective data recording surfaces of the magnetic disk, first and second sides, and a depression formed in the second surface along said second side of the magnetic disk cartridge, said magneto-optic disk unit comprising:

a casing (52) having an opening through which a disk cartridge is inserted into and extracted from said casing;

a cartridge holder (53) having an inserting opening for receiving the disk cartridge which is inserted through the opening of said casing; and an erroneous insertion preventing mechanism (60) which is provided on said cartridge holder, said erroneous insertion preventing mechanism comprising an erroneous insertion preventing part (62) which is provided in an inserting path of the disk cartridge and confronts the sloping surface of a magneto-optic disk cartridge inserted through the opening of said casing in a first orientation for permitting the insertion of a magneto-optic disk cartridge to a predetermined position within said cartridge holder when the magneto-optic disk cartridge is inserted in said first orientation, said erroneous insertion preventing part (62) including a portion (68) which engages the front edge of a magnetic disk cartridge which is inserted through the opening of said casing in a first orientation and prohibits the insertion of the magnetic disk cartridge to said predetermined position within said cartridge holder when the magnetic disk cartridge is inserted in said first orientation, said portion of said erroneous insertion preventing part engaging the depression of a magnetic disk cartridge inserted through the opening of said casing in a second orientation and prohibiting the insertion of the magnetic disk cartridge to said predetermined position within said cartridge holder when the magnetic disk cartridge is inserted in said second orientation, the first surface of the magnetic disk cartridge facing up in said first orientation and the second surface of the magnetic disk cartridge facing up in said second orientation.

9. A magneto-optic disk unit for playing a magneto-optic disk which is accommodated within a magneto-optic disk cartridge, said magneto-optic disk cartridge having a generally rectangular shape with a front edge, first and second surfaces confronting respective data recording surfaces of the magneto-optic disk, first and second sides, a sloping portion formed in the front edge adjacent said first side of the magneto-optic disk cartridge and a depression formed in the second surface along said second side of the magneto-optic disk cartridge, said magneto-optic disk cartridge having a size and structure similar to those of a magnetic disk cartridge which accommodates a magnetic disk and has a thickness t2 which is smaller than a thickness t1 of said magneto-optic disk cartridge, said magnetic disk cartridge having a generally rectangular shape with a front edge, first and second surfaces confronting respective data recording surfaces of the magnetic disk, first and second sides, and a depression formed in the second surface along said second side of the magnetic disk cartridge, said magneto-optic disk unit comprising:

- a casing (52) having an opening through which a disk cartridge is inserted into and extracted from said casing;
- a cartridge holder (53) having an inserting opening for receiving the disk cartridge which is inserted through the opening of said casing; and
- an erroneous insertion preventing mechanism (60) which is provided on said cartridge holder, said erroneous insertion preventing mechanism comprising an erroneous insertion preventing part (62) which is provided in an inserting path of a magneto-optic disk cartridge and confronts the sloping surface of the magneto-optic disk cartridge which is inserted through the opening of said casing in a first orientation for permitting the insertion of a magneto-optic disk cartridge to a predetermined position within said cartridge holder when the magneto-optic disk cartridge is inserted in said first orientation,
- said erroneous insertion preventing part (62) including a portion which engages the front edge of a magnetic disk cartridge inserted through the opening of said casing in a first orientation and prohibits the insertion of the magnetic disk cartridge to said predetermined position within said cartridge holder when the magnetic disk cartridge is inserted in said first orientation,
- said erroneous insertion preventing part (62) being pivotally provided on said cartridge holder and said portion of said erroneous insertion preventing part having a sloping surface which makes contact with the front edge of the magnetic disk cartridge, said erroneous insertion preventing part remaining in the inserting path of said cartridge holder even when said sloping surface is pushed by the front edge of the magnetic disk cartridge which is inserted in said first orientation.

10. The magneto-optic disk unit as claimed in claim 9 wherein said erroneous insertion preventing part has a generally pyramid shape, said sloping surface constituting one surface of the pyramid shape.

* * * * *

UNITED STATES PATENT AND TRADEMARK OFFICE
CERTIFICATE OF CORRECTION

PATENT NO. : 5,063,554

DATED : November 5, 1991

INVENTOR(S) : Keiji Uehara

It is certified that error appears in the above-identified patent and that said Letters Patent is hereby corrected as shown below:

Claim 1, column 7, line 24    delete "part" and substitute therefor ---element---

Signed and Sealed this

Twenty-ninth Day of June, 1993

Attest:

MICHAEL K. KIRK

*Attesting Officer*    *Acting Commissioner of Patents and Trademarks*